United States Patent [19]

Fish et al.

[11] Patent Number: 5,181,503
[45] Date of Patent: Jan. 26, 1993

[54] STONE SLAB SAW

[75] Inventors: Donald D. Fish; James K. Standish, both of Bedford, Ind.

[73] Assignee: W. F. Meyers Company, Inc., Bedford, Ind.

[21] Appl. No.: 721,161

[22] Filed: Jun. 26, 1991

[51] Int. Cl.$^5$ .................. B24B 21/00; B28D 1/08; B28D 1/12
[52] U.S. Cl. .................................... 125/21; 83/651.1; 51/135 R
[58] Field of Search .............. 125/21, 22, 12, 18; 83/651.1; 51/135 R, 135 BT

[56] References Cited

U.S. PATENT DOCUMENTS

| | | | |
|---|---|---|---|
| 1,043,433 | 11/1912 | Jackson | 125/21 |
| 2,362,979 | 11/1944 | Anderson | 51/135 R |
| 4,856,490 | 8/1989 | Kawase et al. | 125/18 |
| 4,945,889 | 8/1990 | Fish | 125/21 |
| 4,971,022 | 11/1990 | Scott et al. | 125/21 |

FOREIGN PATENT DOCUMENTS

| | | | |
|---|---|---|---|
| 0014776 | 9/1980 | European Pat. Off. | 125/21 |
| 2154428 | 5/1973 | Fed. Rep. of Germany | 125/21 |
| 1241807 | 8/1960 | France | 125/21 |
| 0419402 | 8/1974 | U.S.S.R. | 125/21 |

*Primary Examiner*—Robert A. Rose
*Attorney, Agent, or Firm*—Woodard, Emhardt, Naughton Moriarty & McNett

[57] ABSTRACT

A stone slab saw. A continuous flexible belt is drivingly mounted to a plurality of sheaves rotatably mounted to a frame. A motor belt combination is operable to drive one of the sheaves and move the belt. The frame is vertically movable by a pair of racks and pinions driven by a motor. The belt includes a plurality of abrasive pad holders mounted thereto with each holder including an abrasive pad having an outwardly facing abrasive surface. A guide bar mounted to the frame is in tension guiding the belt along a straight path and providing a rigid backing as the belt is driven and lowered through the block of stone cutting a slab therefrom.

6 Claims, 3 Drawing Sheets

STONE SLAB SAW

BACKGROUND OF THE INVENTION

1. Field of the Invention

This invention is in the field of devices for cutting stone.

2. Description of the Prior Art

A number of techniques have been used to cut marble, stone, granite and the like. In U.S. Pat. No. 3,884,212 issued to Armstrong et al. there is disclosed a wire saw having an endless configuration. The saw is adapted to be mounted on a pair of sheaves with a plurality of spaced apart metal sleeves containing abrasive material providing the cutting elements on the wire. In the more recent U.S. Pat. Nos. 4,679,541 and 4,945,889 issued to Fish there is disclosed a pivoting belt configured saw for cutting a slot into stone. This latter type of saw is particularly useful in cutting stone while it remains within the ground. In the latter patent, a continuous belt having abrasive strips thereon is movably mounted to a pair of sheaves between which is positioned a guide which emits a lubricant to facilitate the movement of the belt upon the guide. Another stone cutting device having a sheave mounted to the distal end of a main body is shown in the U.S. Pat. No. 4,181,115 issued to Horst Weisner. In U.S. Pat. No. 3,534,508 issued to Del Vecchio there is shown a belt sander having a reinforcement plate located between a pair of spaced apart sheaves.

Once a block of stone has been cut and removed from the ground, there is a need for slicing the block into thin slabs. Despite the prior devices, there is still a need for a saw which will quickly cut a free standing block into slabs. Disclosed herein is a saw having a continuous abrasive belt movably mounted to a frame. The frame is vertically movable relative to the block. The frame includes a pre-stressed plate or bar guiding the saw accurately through a straight path while simultaneously applying downward pressure forcing the belt against the block of stone.

SUMMARY OF THE INVENTION

One embodiment of the present invention is: a device for cutting a block of stone into slabs comprising a main frame and a continuous flexible belt movably mounted to the main frame and including an inwardly facing surface extending around the main frame. The belt further including an outwardly facing abrasive surface extending in a plane laterally across the belt for engaging and cutting a block of stone. A first driver is mounted to the main frame and is engaged with the belt for continuously moving the belt across the block of stone in a single direction. A guide on the main frame includes opposite end portions with a downwardly opening recess extending therebetween complementarily receiving the inwardly facing surface guiding the belt as the belt is moved by the driver in the single direction. The guide is in a state of tension providing a straight and rigid backing for the belt. A second driver connected to the main frame is operable to force the main frame with the guide downwardly backing the belt so the abrasive surface cuts a slot into the block of stone forming a slab.

It is an object of the present invention to provide a new and improved device for cutting a free standing block of stone into slabs.

An additional object of the present invention is to provide a device for quickly cutting a block of stone.

An additional object of the present invention is to provide a saw for cutting a straight slot through stone.

Related object and advantages of the present invention will be apparent from the following description.

DESCRIPTION OF THE PREFERRED EMBODIMENT

Figures 1A, 1B:
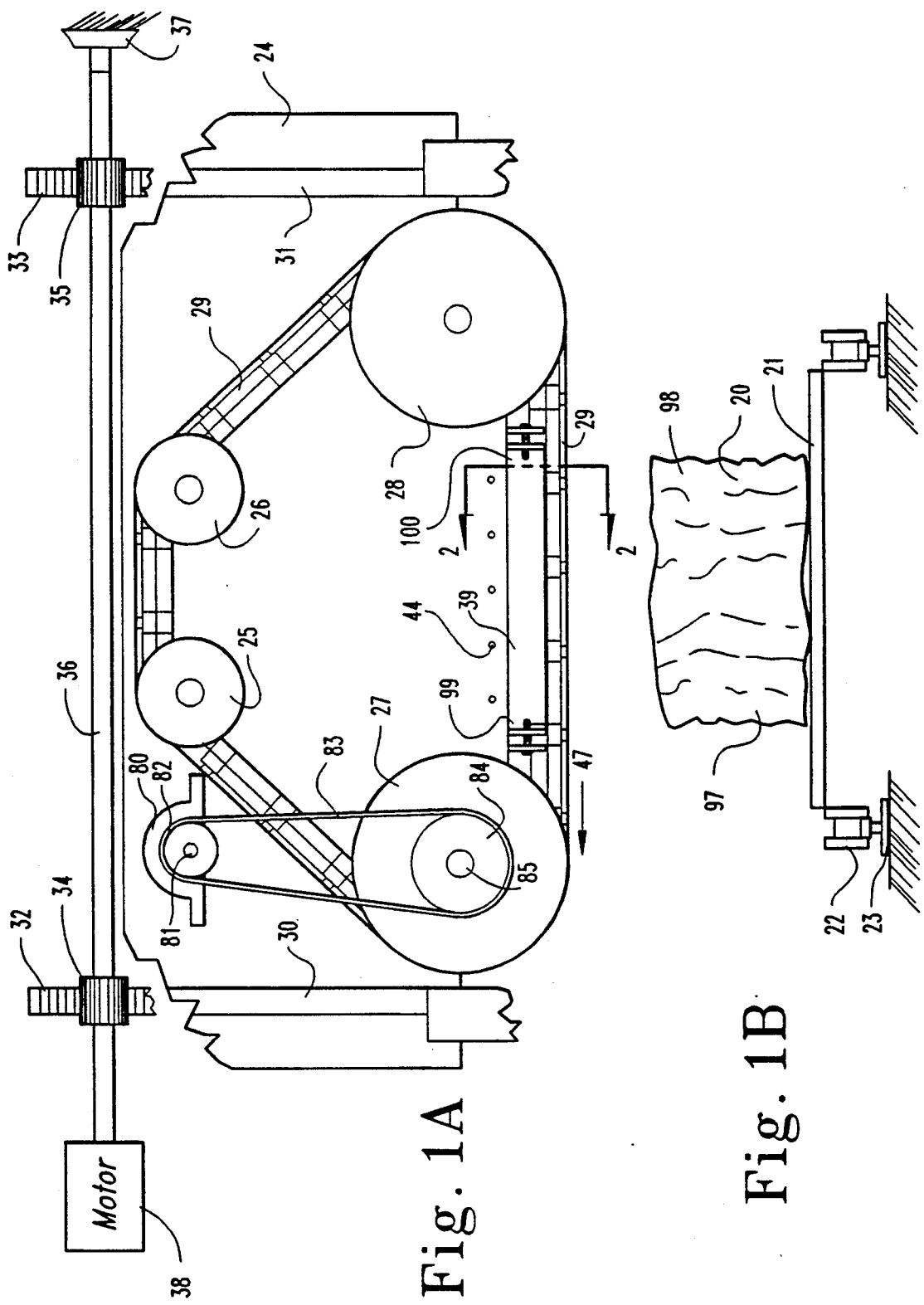
FIG. 1A is a side view of the stone saw incorporating our present invention.
FIG. 1B is a side view of a stone atop a flat bed.

For the purpose of promoting an understanding of the principle of the invention, reference will now be made to the embodiment illustrated in the drawings and specific language will be used to describe the same. It will nevertheless be understood that no limitation of the scope of the invention is thereby intended, such alteration and further modification in the illustrated device, and such further application of the principle of the invention as illustrated therein being contemplated as would normally occur to one skilled in the art to which the invention relates.

Referring now more particularly to FIG. 1, there is shown a device for cutting a block of stone into slabs. The block 20 rests upon a flatbed 21 having a plurality of wheels 22 rotatably mounted thereto. The wheels in turn are rollingly engaged with rails 23 to allow the flatbed and stone block to be rolled beneath the saw.

The saw includes a main frame 24 having rotatably mounted thereon a pair of belt tensioning sheaves 25 and 26. A second pair of larger diametered sheaves 27 and 28 are rotatably mounted to frame 24. A continuous saw belt 29 is mounted to sheaves 25-28 and is driven or pulled in the direction of arrow 47 by means of an electric motor belt combination to cut a slot into the stone block as the saw is lowered downwardly.

A pair of toothed racks 30 and 31 are fixedly mounted to a pair of upright posts and have top end portions 32 and 33 in meshing engagement with a pair of pinions 34 and 35. The pinions are fixedly mounted to a shaft 36 having one end rotatably mounted by mount 37 to frame 24 with the opposite end connected to a gear reducer and motor 38 mounted to frame 24. The motor is operable to rotate shaft 36 thereby causing pinions 33 and 34 along with frame 24 to move upwardly or downwardly on racks 32 and 33 depending upon the direction of shaft rotation. Racks 30 and 31 are shown as fragmented, it being understood the racks have sufficient length to allow the saw belt to engage and cut the block of stone.

Figure 2:
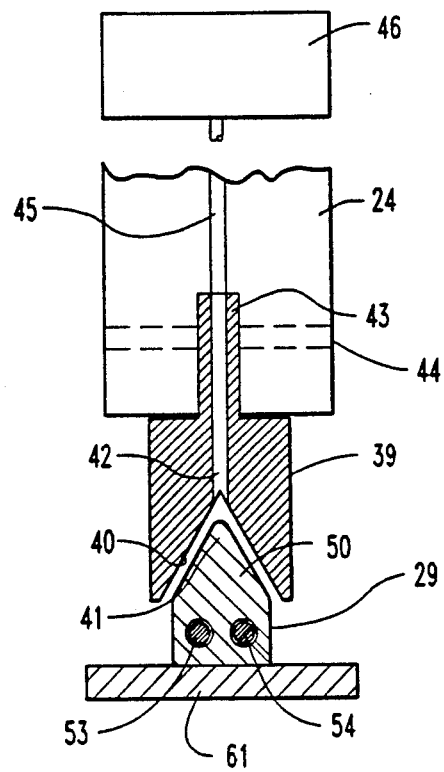
FIG. 2 is an enlarged cross-sectional view taken along 2—2 of FIG. 1A and viewed in the direction of the arrows.

Mounted to the bottom of frame 24 is a guide bar 39 having belt 29 slidably mounted thereto. An inverted v-shaped recess 40 (FIG. 2) is centrally formed and extends through the length of bar 39 and complimentarily receives the inverted v-shaped top end 41 of belt 29. Bar 39 includes a longitudinally and upwardly extending ridge 43 which fits into a downwardly opening slot formed in the bottom end of frame 24. A plurality of conventional fastening devices 44 such as, rivets or countersunk bolts extend through frame 24 and ridge 43 thereby mounting bar 39 fixedly to frame 24. A plurality of liquid passages 42 extend vertically from the inverted v-shaped recess 40 upwardly through the bar and through ridge 43 being in liquid communication with a plurality of downwardly extending liquid passages 45 formed in frame 24. A pressurized source of lubricant 46 is connected to passage 45 so as to force lubricant, such as water, downwardly through passages 45 and 42 exiting into the space between the downwardly facing recess 40 of bar 39 and the upwardly extending top end portion 41 of belt 29. Thus, as belt 29 is moved in the direction of arrow 47, the water is operable to lubricate the belt allowing ease of motion relative to bar 39. Likewise, the downwardly flowing water will exit the space between the bar and belt flowing downwardly onto block 20 providing a lubricant between the abrasive cutting surface of the belt and the block of stone.

Figure 3:
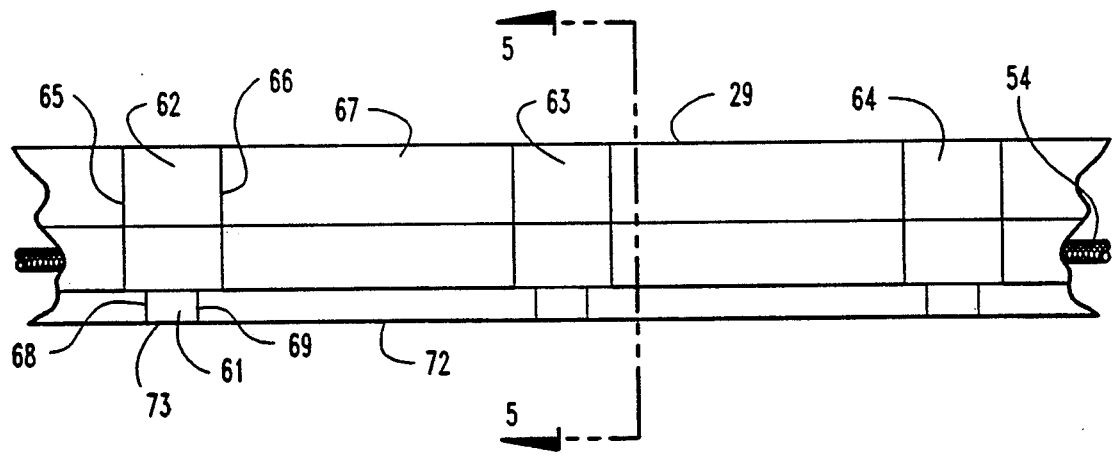
FIG. 3 is a fragmentary enlarged side view of the belt of FIG. 1A.
Figure 4:
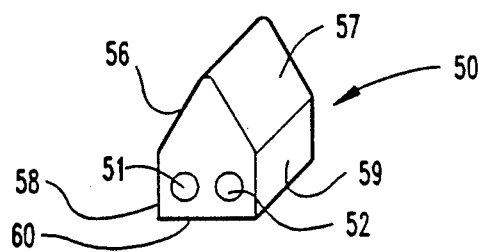
FIG. 4 is an enlarged perspective view of the abrasive pad mounting block.

Belt 29 includes a plurality of metal mounting blocks 50 (FIG. 4) having a pair of holes 51 and 52 extending therethrough. A pair of continuous cables 53 and 54 (FIG. 2) extend through holes 51 and 52 with the cables providing continuous flexible elongated members extending through the belt and the mounting blocks providing strength to the belt. The mounting blocks have a five-sided configuration, excluding the opposite ends, with two of the sides 56 and 57 forming an inverted v-shaped top for the mounting block to conformingly fit within recess 40 of bar 39. The opposite sides 58 and 59 are parallel and extend downwardly from sides 56 and 57 being arranged perpendicularly to the bottom surface 60. An abrasive pad is fixedly secured to bottom surface 60 by suitable means such as brazing. Holes 51 and 52 extend through the opposite ends of the mounting block and are parallel to the sides 58 and 59 and bottom surface 60. Mounting blocks 50 are spaced along the length of belt 29 as shown in FIG. 3. As one embodiment, the mounting blocks were spaced approximately one and one half inches apart.

Figure 5:
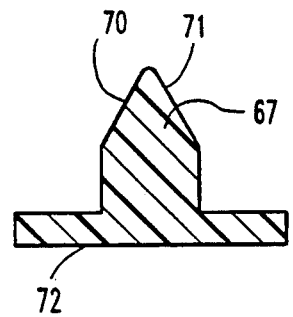
FIG. 5 is an enlarged cross section of the plastic portion of the belt.

The abrasive pad 61 (FIG. 2) is fixedly secured to bottom surface 60 of mounting block 50 and extends outwardly of sides 58 and 59 to at least the same width as frame 24. The length of each pad is shorter than the length of the mounting blocks. For example, in FIG. 3 three mounting blocks 62, 63, and 64 are shown spaced apart a distance of one and one half inches. Mounting block 62-64 are identical to mounting block 50. Mounting block 62 has opposite ends 65 and 66 through which apertures 51 and 52 extend with the length of mounting block 62 being the distance from end 65 to 66. In the embodiment shown in FIG. 3, the length was approximately one half inch. The abrasive pad while being wider than the mounting block and frame 24 as shown in (FIG. 2) has a length of approximately only three-eighths of an inch being spaced equidistant inwardly of the ends 65 and 66 (FIG. 3) of the mounting block. Once the abrasive pads are secured to the mounting blocks and cables 53 and 54 are extended through the mounting blocks, the entire combination is then placed within a mold to form the plastic main body of the belt. The plastic main body 67 of belt 29 extends between the mounting blocks and between the mounting pads mounted to adjacent mounting blocks. Further the plastic main body surrounds cables 53 and 54 and extends up to the adjacent ends 68 and 69 of the abrasive pads. Plastic main body 67 (FIG. 5) is sized and configured identically to the mounting block 50 having an abrasive pad 61 secured thereto. Thus, the top converging surfaces 70 and 71 (FIG. 5) of plastic main body 67 are parallel and aligned with sides 56 and 57 of the mounting block 50 thereby providing the belt with a uniform wedge shaped top end projecting into the recess formed by the bottom end of mounting bar 39. The bottom surface 72 (FIG. 5) of the plastic main body is flush with the bottom surface 73 (FIG. 3) of the abrasive pad. In one embodiment, bottom surface 72 was inset one-sixteenth of an inch from the abrasive bottom surface 73. In such an embodiment, a plastic ridge was formed on bottom surface 72, flush with surface 73, and extending the length of the plastic body between adjacent abrasive pads and centrally located on bottom surface 72 preventing the abrasive surface from catching on irregular external projections.

A conventional electric motor 80 is mounted to frame 24 and includes a rotatable output shaft 81 having sheave 82 mounted thereto. The sheave engages and drives belt 83 in turn drivingly engaged with sheave 84 mounted to the axle 85 having sheave 27 mounted thereon. Thus, by operation of motor 80 sheave 27 is caused to rotate thereby moving belt 29.

Figure 6:
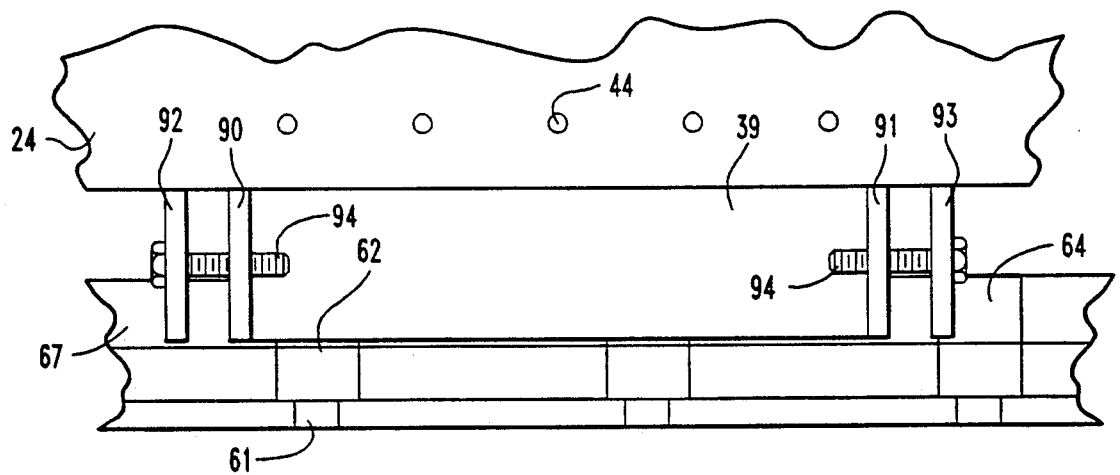
FIG. 6 is a fragmentary enlarged side view of the belt and guide bar.

Guide bar 39 is mounted to main frame 24 so that the guide bar is in a state of tension. A variety of means may be utilized to tension bar 39. In the embodiment shown in FIG. 6, guide bar 39 includes a first pair of flanges 90 fixedly secured to one end of the bar and a second pair of flanges 91 fixedly secured to the opposite end of the bar. Frame 24 includes a first wall 92 and a second wall 93 fixedly secured thereto and positioned outwardly of flanges 90 and 91. A pair of conventional fastening devices 94 extend through flange 90 and wall 92 and through flange 91 and wall 93 and are tightened. Walls 92 and 93 are sufficiently thick and are braced so that when fasteners 94 are tightened walls 92 and 93 are immovable thereby placing bar 39 in tension. Flanges 90 and the adjacent end of bar 39 is thus forced to the left toward wall 92 whereas the opposite end of the bar and flanges 91 are forced in the opposite direction toward wall 93 placing the guide bar in a state of tension and insuring that the bar remains rigid and straight as belt 29 is moved in the direction of arrow 47 (FIG. 1A) and frame 24 and belt 29 are moved downwardly thereby cutting a slot into block 20. Guide bar 39 in such a state of tension not only provides a straight path to guide belt 29 but also serves as a backup applying downward pressure to the belt insuring the slot is cut efficiently and fast in the block of stone.

The abrasive pads 61 affixed to the mounting blocks 50 include an outwardly facing abrasive surface with the pad being produced from any number of alternative ways. For example, the pad may be produced from a powdered metal mix such as bronze having diamonds of a size of U.S. 16-20 mesh positioned uniformly throughout. The powdered metal and bronze may be inserted into a resistance sintering press and heated to 1800° F. Likewise, the pad may be produced in a manner identical to that described in the commonly owned U.S. Pat. No. 4,945,889 which is herein incorporated by reference.

Most importantly, the power means or motor 80 is operable to drive the belt 29 continuously across block 20 in a single direction. Guide bar 39 is operable to guide the belt in the single direction shown by arrow 47 in FIG. 1A providing a straight path as well as a rigid backing as the saw is moved downwardly through the stone. Motor 38 in conjunction with the rack and pinion combination shown in FIG. 1A is operable to force main frame 24 along with belt 29 downwardly thereby cutting a slab from the block. As distinguished from the boom or pivoting saw such as disclosed in U.S. Pat. No. 4,181,115 issued to Weisner, motor 38 and the rack and pinions are operable to force the opposite ends of frame 24 attached respectively to racks 30 and 31 along with the opposite ends of belt 29 extending respectively around sheaves 27 and 28 downwardly an equal distance. As a result, the slot cut into stone 20 will have a uniform depth extending the length of the block. Since the opposite ends of frame 24 are extending downwardly through an equal distance, end 99 (FIG. 1A) of guide bar 39 is moved downwardly through block 20 a distance equal to the distance end 100 of the guide bar is moved downwardly. That is, the depth of the slot at end 97 of block 20 will be equal to the depth of the slot extending through end 98 of the block. The drive means consisting of motor 38 and pinions 34 and 35 are operable to move racks 30 and 31 in unison thereby moving the opposite end portions of guide bar 39 an equal amount.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for cutting a block of stone into slabs comprising:
   a main frame;
   a continuous flexible belt including a continuous flexible metal cable with said belt movably mounted to said main frame and including an inwardly facing surface extending around said main frame, said belt further including an outwardly facing abrasive surface extending in a plane laterally across said belt for engaging and cutting a block of stone;
   first drive means mounted to said main frame and engaged with said belt for continuously moving said belt across said block of stone in a single direction;
   guide means on said main frame including opposite end portions with a downwardly opening recess extending therebetween complementarily receiving said inwardly facing surface guiding said belt as said belt is moved by said first drive means in said single direction, said guide means is in a state of tension providing a straight and rigid backing for said belt;
   second drive means connected to said main frame operable to force said main frame with said guide means downwardly backing said belt so said abrasive surface cuts a slot into said block of stone forming a slab;
   lubrication means connected to said guide means and operable to force a lubricant between said recess and said inwardly facing surface; and,
   a plurality of mounting blocks mounted to said cable and having said abrasive surface mounted thereon, said blocks each including a metal main body with an inwardly projecting portion and an opposite distal end, said blocks each further including an abrasive strip affixed to said distal end with said blocks including passages through which said cable extend, said mounting blocks with abrasive strips each forming a geometric cross section; and wherein:
   said guide means includes a bar mounted to said frame with said downwardly opening recess thereon to complementarily and slidably receive said inwardly facing surface of said belt and said inwardly projecting portion of said mounting blocks, said guide means further includes a plurality of passageways opening into said recess with said passageways in communication with said lubrication means to space said belt with said blocks apart from said bar;
   said belt is of molded plastic construction with said molded plastic construction having a cross section the same as said geometric cross section and extending between said plurality of mounting blocks and around said cable to a position adjacent to said abrasive surface holding said blocks in place on said cable, said inwardly facing surface is formed by said plastic construction and by said blocks and has an inverted shape projecting into said downwardly facing recess of said guide means.

2. The device of claim 1 wherein:
   said abrasive strip includes a width greater than each of said blocks and said main frame extending laterally across said belt and a length less than each of said blocks extending along said belt in said single direction; and,
   said molded plastic construction of said belt extends to a position flush with said abrasive surface.

3. The device of claim 1 wherein:
   said guide means includes said recess having an inverted v-shape to receive said belt, said bar includes a plurality of lubricant passages extending from external of said bar and into said recess; and,
   said molded plastic construction of said belt extends to a position inwardly inset from said abrasive surface, said molded plastic construction includes a ridge extending lengthwise and centrally on said belt between adjacent abrasive strips with said ridge extending flush with said abrasive surface limiting said abrasive surface from catching on the stone.

4. A saw for cutting a block of stone into slabs comprising:
   a main frame;
   a pair of drive wheels rotatably mounted on said frame;
   a guide bar mounted in tension to said frame and positioned between said drive wheels, said guide bar including a downwardly opening recess;
   a continuous flexible cable extending around said drive wheels and said guide bar;
   a plurality of mounting blocks each having a metal body with a passage extending therethrough with said cable extending through said passage and with said blocks mounted to said cable, said blocks including a pair of converging surfaces defining an inwardly projecting end slidably received by said guide bar and also received by said drive wheels and driven in a single direction, said blocks further including opposite outer distal ends;

a plurality of abrasive strips fixedly mounted to said distal ends and having an outwardly facing abrasive surface;

molded plastic construction extending around said cable and between said mounting blocks holding said blocks in place on said cable forming a belt with said construction having an inwardly projecting v-shaped end slidably received by said guide bar and also received by said drive wheels, said molded plastic construction having the same geometric configuration as said mounting blocks with said abrasive strips mounted thereto, said plastic construction extending to be flush with said converging surfaces; and, lubrication means mounted to said frame and including a plurality of passages extending through said guide bar opening in said downwardly facing recess at the junction of said converging surfaces of said mounting blocks.

5. The device of claim 4 wherein:

said abrasive strip includes a width greater than each of said blocks and said main frame extending laterally across said belt and a length less than each of said blocks extending lengthwise along said belt in said single direction; and, said molded plastic construction of said belt extends to a position flush with said abrasive surface.

6. The device of claim 4 wherein:

said guide means includes a bar with said recess having an inverted v-shape to receive said belt, said bar includes a plurality of lubricant passages extending from external of said bar and into said recess; and, said molded plastic construction of said belt extends to a position inwardly inset from said abrasive surface, said molded plastic construction includes a ridge extending lengthwise and centrally on said belt between adjacent abrasive strips with said ridge extending flush with said abrasive surface limiting said abrasive surface from catching on said stone.

* * * * *